United States Patent [19]

Bratchley et al.

[11] Patent Number: 5,324,567

[45] Date of Patent: Jun. 28, 1994

[54] INK COMPOSITION AND COMPONENTS THEREOF

[75] Inventors: Robin Bratchley, Berkshire; Nicholas O. Nugent, Hampshire; Linda S. Ellis, Wolverhampton, all of England

[73] Assignee: Thomas de la Rue and Company Limited, London, England

[21] Appl. No.: 910,343

[22] PCT Filed: Dec. 28, 1990

[86] PCT No.: PCT/GB90/02033

§ 371 Date: Jul. 24, 1992

§ 102(e) Date: Jul. 24, 1992

[87] PCT Pub. No.: WO91/11492

PCT Pub. Date: Aug. 8, 1991

[30] Foreign Application Priority Data

Feb. 2, 1990 [GB] United Kingdom ............... 9002360

[51] Int. Cl.$^5$ ............................................. B32B 27/14
[52] U.S. Cl. ....................................... 428/195; 283/72; 106/21 E; 106/22 C; 106/20 C; 428/206; 428/327; 428/402; 428/411.1; 428/500; 428/511; 428/913
[58] Field of Search ................. 428/402, 916, 29, 195, 428/199, 206, 211, 327, 407, 500, 507, 411.1, 511, 913; 283/57, 72, 85, 91, 902; 106/20 C, 21 E, 22 C, 23 C

[56] References Cited

U.S. PATENT DOCUMENTS

| | | | |
|---|---|---|---|
| 4,071,298 | 1/1978 | Falconer | 356/73 |
| 4,125,534 | 11/1978 | Yee | 260/315 |
| 4,127,329 | 11/1978 | Chang et al. | 356/301 |
| 4,175,776 | 11/1979 | Ranauro | 283/8 B |
| 4,220,747 | 9/1980 | Preziosi et al. | 526/285 |
| 4,258,146 | 3/1981 | Balanson et al. | 525/106 |
| 4,439,346 | 3/1984 | Patel et al. | 252/408.1 |
| 4,469,826 | 9/1984 | Carlick et al. | 523/339 |
| 4,869,532 | 9/1989 | Abe et al. | 283/88 |

FOREIGN PATENT DOCUMENTS 0036899 10/1981 European Pat. Off. .
0263446 10/1987 European Pat. Off. .

OTHER PUBLICATIONS

"Measuring Particle Diameter of Inorganic Oxide(s)-By Raman Spectroscopic Analysis", Tosoh Corp.
"Raman Scattering on Microparticles: Size Dependence", G. Schweiger, *J. Opt. Soc. Am. B*, vol. 8, No. 8, Aug. 1991, pp. 1770–1778.

*Primary Examiner*—Patrick J. Ryan
*Assistant Examiner*—Marie R. Macholl
*Attorney, Agent, or Firm*—Oliff & Berridge

[57] ABSTRACT

Raman-active compounds such as polydiacetylenes are provided in the form of particles whose maximum dimension is 40 μm. They can be formulated into inks, for the purpose of printing on security documents which are thus readily capable of authentication.

21 Claims, No Drawings

INK COMPOSITION AND COMPONENTS THEREOF

FIELD OF THE INVENTION

This invention relates to ink compositions and components thereof, and to their use on banknotes and other security items, for the purposes of authentication.

BACKGROUND OF THE INVENTION

Security-printed items such as banknotes, cheques, passports, licences and tickets need to be produced in a manner which allows genuine articles to be authenticated. The security printing industry has seen a wide variety of measures being adopted, ranging from easily-recognisable visual features through discrete visual features to machine-verifiable characteristics. As with the visual features some machine-readable attributes may be relatively readily apparent, such as fluorescent features, while others may be more concealed, requiring specially-made authenticating apparatus.

A security printer is able to select a variety of measures to prevent counterfeiting and forgery and to allow authentication. Any one document will include a range of them, and the choice of those that are actually included in any one document or part of a document presents a formidable obstacle to wrong-doers.

There is a constant need to add to the measures which are employed, particularly those which lend themselves to present-day security printing manufacturing and sorting equipment such as automatic banknote-sorting equipment.

The Raman spectra of chemical compounds have been used for many years as a means of identification. Raman spectra arise when laser light incident upon a sample of the material is scattered: the scattered light includes light of the laser wavelength plus, at much lower intensity, light of additional wavelengths which are characteristic of the compound. The additional light appears at frequencies which are shifted from that of the laser beam by amounts equal to the frequencies of collective vibrations of the atoms in the compound. These frequencies are determined by the masses of the atoms comprising the material and the forces which hold them together. As these are almost always unique for every chemical compound, the Raman spectrum is often used as its fingerprint. In this way, the compound may be identified in various conditions, for example as a crystal, in solution, as a powder and in mixtures with other compounds.

In most respects, conventional Raman scattering spectroscopy provides very similar information to that obtained from infra-red absorption spectroscopy. As the instrumentation is usually considerably more expensive than that for a comparable infra-red apparatus, Raman spectroscopy has usually only been used when infra-red spectroscopy is incapable of providing required information.

Resonance Raman scattering (RRS) occurs when the wavelength of the incident laser beam is equal to, i.e. in resonance with, that of an optical absorption band in the material. The electrons responsible for the absorption are often located on a subset of atoms in the compound, known as the chromophore. Under resonance conditions, the Raman scattered light which is frequency-shifted by the collective vibrations of atoms in the chromophore will be greatly enhanced in intensity.

The intensity of RRS is particularly high for compounds, such as polydiacetylenes, in which the chromophore is a conjugated polymer backbone. The intensities of Raman lines due to collective vibrations of the backbone atoms of a polydiacetylene under resonance conditions can be at least $10^4$ times greater than those arising from atomic vibrations in the side-groups.

U.S. Pat. No. 4,125,534 and EP-A-0036899 disclose various carbazolyl polydiacetylenes, their synthesis, and also their use as photoconductors and non-linear optical materials. The polymers which are produced by the given procedures are generally crystalline.

SUMMARY OF THE INVENTION

The present invention is based on the discovery that Raman-active compounds such as polydiacetylenes are of value as components of an ink for printing security documents which can be simply identified by RRS. By contrast to polydiacetylenes of the type described in the prior art, those of the present invention are surprisingly found to be suitable for use in inks, and for that purpose they are in the form of particles having a maximum dimension of 40 μm.

It has been discovered that crystalline polydiacetylenes cannot simply be ground to the desired particle size; the product of grinding is fibrous rather than uniformly and finely particulate. According to the present invention, therefore, a polymeric Raman-active compound having the desired particle size is prepared by polymerisation of the corresponding monomer which has itself been processed to a relatively small particle size.

DESCRIPTION OF THE INVENTION

The preferred Raman-active compounds for use in this invention are polydiacetylenes. Polydiacetylenes have repeating units of formula I

$$=CR-C\equiv C-CR^1= \qquad I$$

such as in either of the following

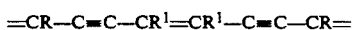
$$=CR-C\equiv C-CR^1=CR^1-C\equiv C-CR= \qquad Ia$$

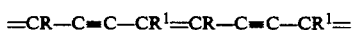
$$=CR-C\equiv C-CR^1=CR-C\equiv C-CR^1= \qquad Ib$$

and are prepared by polymerisation of corresponding monomers of formula II

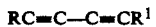
$$RC\equiv C-C\equiv CR^1 \qquad II$$

where R and $R^1$ are typically independently selected from alkyl and substituted alkyl groups, preferably monosubstituted alkyl groups, including urethane-modified alkyl, arylsulphonyl-modified alkyl, heterocyclic-substituted alkyl and heterocyclic-substituted substituted alkyl, hydroxyalkyl, ether-substituted alkyl, ester-substituted alkyl, amide-substituted alkyl and carboxy-substituted alkyl. Preferably, any long-chain substituted alkyl should be of a substantially linear nature. Salts of these compounds may also be employed. Various such compounds are described in, for example, U.S. Pat. No. 4220747 and U.S. Pat. No. 4125534, the relevant contents of which are incorporated herein by way of reference.

The packing of the monomer in a crystal lattice is mainly determined by the interactions between the end-groups, R and $R^1$, which thus play a major role in determining monomer reactivity. In general, reaction is favoured if the side-groups have strong interactions, e.g. hydrogen bonds or dipole-dipole interactions.

Polymerisation of diacetylenes can be initiated chemically, thermally or with ionising radiation, including electron beams. The reaction mechanism is now well understood. Despite the occurrence of highly reactive intermediates, the reaction is insensitive to oxygen, since the reactivity of the chain end is protected by the surrounding monomer crystal. It has been established that there is an anti-correlation of thermal and radiation polymerisation. Materials with rapid radiation polymerisation generally polymerise slowly when heated, and vice versa.

For example, certain diacetylenes may be polymerised by heating a thin layer, e.g. in an oven. Alternatively, a suspension of the diacetylene in an inert solvent may be heated. This can give greater thermal control when dealing with large batches of material.

Illustrative examples of diacetylene monomers which may be polymerised to provide polydiacetylenes suitable for use in the invention include the following:
hexa-2,4-diyne-1,6-bis(4-toluenesulphonate) [Compound 1];
dodeca-5,7-diyne-1,12-bis(ethylurethane) [Compound 2];
dodeca-5,7-diyne-1,12-bis(isopropylurethane) [Compound 3];
tricosa-10,12-diynoic acid lithium salt [Compound 4];
tricosa-10,12-diynoic acid Cd salt [Compound 5];
pentacosa-10,12-diynylpyridine-4'-carboxylate hydrochloride [Compound 6];
deca-4,6-diyne-1,10-bis(n-butoxycarbonylmethyl urethane) [Compound 7];
dodeca-5,7-diyne-1,12-bis(n-butoxycarbonylmethylurethane) [Compound 8];
docosa-10,12-diyne-1,22-bis(n-butoxycarbonylmethyl)urethane [Compound 9];
docosa-10,12-diynebis(4-tolyl acetate) [Compound 10];
hexa-2,4-diyn-1-ol [Compound 11];
1,6-bis(9-carbazolyl)hexa-2,4-diyne [Compound 12];
hexa-2,4-diyne-1,6-bis(ethylurethane) [Compound 13]; and
tricosa-10,12-diynoic acid [Compound 14].

These compounds are also shown in Table 1 (where pyr=pyridine). The utility of many of them is demonstrated in the Examples.

For the purposes of the present specification, a compound is defined as "Raman-active" if, when applied to a substrate and exposed to laser light, it produces resonance Raman scattering or other Raman scattering of similar intensity. The laser light may be in the ultraviolet, visible or near infra-red region of the spectrum. In the case of resonance Raman scattering, the laser light wavelength will fall within the optical absorption band of the material. Thus for polydiacetylenes that absorb in the red region of the spectrum, a red laser such as a HeNe laser, emitting at a wavelength of 632.8 nm, is suitable. Alternatively a single mode diode laser may be employed.

The level of Raman scattering of a compound in a surface coating or film can be measured using equipment described in a copending International Patent Application also in the name of The De La Rue Company plc et al, entitled "Detection Apparatus", PCT/GB90/02032 filed Dec. 28, 1990. Such apparatus is appropriate for the determination of relative intensities, in order to determine whether a compound is suitable for use in the invention. The Raman-active compounds defined in this specification, when exposed to laser light with an incident intensity of 1.5 to 3.2 mW, will produce a Raman scattering intensity at the photomultiplier that is detectable above the background fluorescence (in the absence of the Raman-active compound). More specifically, when a X40 objective of numerical aperture 0.65 is used, the Raman scattering at the photomultiplier will be at least 0.001 pW above the intensity of the background fluorescence. Preferably, the resonance Raman scattering is at least 0.05 pW, more preferably at least 0.1 pW, usually at least 0.5 pW, and most preferably at least 2 pW, above that of the background fluorescence (in the absence of the Raman-active compound) (See Example 11).

An alternative definition is applicable for materials which show resonance Raman scattering on excitation in the red region of the spectrum. In such cases, the intensity of the resonance Raman scattering should be a factor of at least 0.005, preferably at least 0.05, more preferably at least 0.25, of the Raman signal intensity obtained for the (reference) polydiacetylene obtained by polymerising compound 12, the intensity being measured at the wavelength at which the Raman emission is at a maximum.

The compound-bearing substrate may be obtained by the procedure defined in Example 1, i.e. the compound is applied as a constituent of an ink, or it may be obtained by dispersion or distribution of the compound in a plastics substrate at a loading of 1–10%, e.g. a cast plasticised PVC film, 100 $\mu$m thick.

Raman-active polydiacetylenes for use in the invention are known or may be prepared by known procedures, as indicated above. The degree of polymerisation must be sufficient to meet the required characteristic intensity of RRS.

An ink composition of the invention may comprise 0.1 to 20, preferably 1 to 10%, by wet weight of the Raman-active compound. The ink may also comprise other, conventional, materials such as driers and, if desired, other pigments. The ink vehicle will be chosen according to the desired use which may be, for example, by lithography, letterpress printing, intaglio printing or screen printing.

The particles of the Raman-active compound may have a maximum dimension of 40 $\mu$m, especially for screen printing. For intaglio, letterpress printing and lithography especially, the maximum dimensions will be respectively 10 $\mu$m, 5 $\mu$m and 1 $\mu$m. These figures refer to the longest dimension as measured on a microscope.

When it is considered that the Raman-active compound is usually formulated with resins and pigments, it is surprising that security documents printed with an ink can be identified by RRS, and it appears that the effect can be even greater than for a single crystal. It is evident that security documents should be machine-readable, and it is an advantage of the present invention that simple machines can be used to read such documents. Suitable apparatus is that described in the co-pending Patent Application, in which a laser is used as the illuminating source.

Such equipment will detect Raman-scattered light within a narrow, preset wavelength range. For a resonance Raman-active compound to be detected by this equipment, it must have a suitable optical absorption band, it must include bonds on the chromophore which possess particular fundamental vibration frequencies, and preferably it must also be non-fluorescent in the infrared. This third criterion is less important if the fluorescence is wide-band, such that a larger proportion can be filtered out.

For the purposes of illustration, the polymer of Compound 1, as a single crystal, has a resonance Raman spectrum typical of polydiacetylenes, using a HeNe laser source. The spectrum has one line at about 2100 cm$^{-1}$, two near 1500 cm$^{-1}$ and two between 900 and 1300 cm$^{-1}$, displaced to lower energy from the incident laser source wave number. The two highest frequency lines arise from vibrational modes in which there is large amplitude of motion about the triple and double bonds, respectively, on the backbone. The number of lower frequency lines present in the spectrum is dependent upon the nature of the side-groups. The frequencies of the triple and double bond vibrations are less sensitive to the side-groups, and for crystalline polydiacetylenes are within the ranges 2070–2120 cm$^{-1}$ and 1400–1500 cm$^{-1}$. For disordered polydiacetylenes such as those in solution, gels or precipitates, the ranges are somewhat larger.

Positive identification of a polydiacetylene can be made with reasonable certainty by detecting the triple bond vibration alone. If an intense Raman line is found for a sample at about 2100 cm$^{-1}$ using a HeNe laser then the three criteria are: the chromophore must have an optical absorption band in the 600–650 nm range; there must be one of three bond types, i.e. —C≡C—, —C=C=C— or —C≡N, in the chromophore, as these are the only types which possess fundamental vibration frequencies within the range 2000–2200 cm$^{-1}$; and the chromophore must not be so fluorescent that the Raman-scattered light is swamped at the detector. This requirement excludes a number of potential dyes which could conceivably meet the first two. Positive identification can be made virtually certain by adding a fourth criterion, viz. that the intensity of the Raman-scattered light be nearly the same as that from a reference polydiacetylene sample.

Further, the Raman-active compound should be essentially inert with respect to components of the ink, in order that the ink should be stable, and not lose its colour. Polydiacetylene crystals also have other more or less important characteristics, e.g. a metallic appearance, conductivity, and the thermochromism which has previously been the reason for interest in such compounds. Diamond particles also exhibit strong Raman effects and may be employed if their expense justifies.

Additional materials may be added to the ink to modify its appearance and properties. For example, metallic flake pigment can be added to the ink, to produce a metallic appearance. Fluorescent compounds made visible on ultraviolet exposure may also be added, to increase the security level of the document. Magnetic, conductive, optically-brightening, phosphorescent, iridescent, photochromic and optically-variable additives may also be included together with the Raman-active compound. Compounds which do not absorb at the red end of this spectrum are often advantageous.

In order that the polymer has the desired particle size for use in printing inks it will usually be necessary to reduce the particle size of the monomer, e.g. to a maximum dimension of 40 μm, preferably 10 μm, more preferably 1 μm. This is preferably achieved by using a vibration ball mill, planetary ball mill or, for larger amounts, a jet mill.

Pre-polymerised powders can easily be used in a conventional ink. The insoluble polymers are inert and intractable and are generally compatible with conventional solvents and binders. Polydiacetylenes are good insulators, so that fine polymer powders may be applied by a xerographic printing technique.

Polydiacetylene powders can easily be incorporated into other plastics, providing the processing temperature is below the decomposition point of the polydiacetylene, typically between 120° and 300° C.

An ink composition of the invention may be prepared using pre-polymerised polydiacetylene or other Raman-active polymer. For example, a polymeric film can be obtained and transferred to a suitable substrate. Alternatively, a polymer may be produced by polymerisation of the corresponding monomer in situ. The desirability of this second possibility may depend on the nature of the substrate.

Aggregation of the polymer particles may occur during ink blending, and milling may then be employed to cause deaggregation. In practice, it is not necessary to cause the aggregates completely to be removed. Some aggregation is permitted. Aggregation may be measured with a fineness-of-grind gauge: the fineness of grind should be not greater than the particle sizes necessary for the intended ink.

The various diacetylene monomers shown in Table 1 and the corresponding polydiacetylenes have been tested, and show that Raman-active compounds have a variety of properties which can be utilised to advantage. Thus, as well as in conventional ink systems, for example, thermally-polymerisable monomers, such as Compound 1, would be useful for pre-polymerised powders to be used with binders for dry powder printing (xerography) where the Raman method is to be used for detection.

Compound 6 has reversible thermochromism at 120° C. Compounds 6 and 9 exhibit irreversible blue-to-red colour changes if partially-polymerised material is melted or dissolved. Thus, these two compounds exhibit types of chromism which may also be used for security printing.

Inks of the invention are primarily intended to be printed on to security documents and other authenticatable items. In this context, the substrates used for printing are generally paper, including rag paper, preferably currency-grade paper, plastics-coated or laminated paper, and plastics such as, for example, bankcard-grade PVC, or plastic paper, e.g. non-woven plastic paper. Articles bearing security printing include banknotes, banknote thread, currency, travellers' cheques, cheques, bonds, certificates, stamps, lottery tickets, ownership documents, passports, identity cards, credit cards, charge cards, access cards, smart cards, brand authentication labels and tags, and tamperproof labels.

Security documents normally have different types of printing present selected from intaglio, offset lithographic, letterpress printing and occasionally gravure. An ink of the invention will normally be used in addition to/beside security-printed areas in a variety of colours. Rainbow-printing techniques are often used in security documents.

The Raman-active compound may be included in electro-photographic toners, matrix or daisy-wheel printer inks, and non-impact printing methods.

Raman-active compounds may also be included, not necessarily as inks, in paper including rag papers and plastic papers, banknote threads, plastic cards and other security documents or authenticatable items, if necessary blended with a polymer and bonded other than in an ink. The Raman-active compound may be deposited in a single area or a series of areas, if necessary or desired in a coded pattern.

The Raman-active compound may be incorporated into authenticatable items, e.g. by incorporating it in a label such as a holographic label bearing printing in an ink containing a Raman-active compound, or in a hot-stamping foil construction. In general, the compound may be on or near the surface of the item to be authenticated.

The following Examples illustrate the invention. Examples 1 to 10 illustrate the use of various compounds in inks. Examples 11 and 12 illustrate precise methods of detecting such compounds in accordance with the invention. The effect of added pigments is also examined.

EXAMPLE 1

Compound 2 was included in a letterpress ink vehicle and heated to 100° C. for 24 hours to cause polymerisation. The level of incorporation of the compound was approximately 10% by weight. The ink was found to exhibit thermochromic (light purple to pink) properties and was suitable for providing a security document in accordance with the invention. Light fastness was moderate. The particle sizes of the unpolymerised and polymerised compounds were found to be less than 10 $\mu$m by microscopy.

EXAMPLE 2

Example 1 was repeated with Compound 2, except that polymerisation was caused by gamma irradiation prior to ink preparation. The ink was suitable for use in the invention and exhibited some partially-reversible thermochromism. The chemical stability of the ink was good. The thermochromic change was from light maroon to pink. The polymerised particle size was found to be less than 10 $\mu$m by microscopy.

EXAMPLE 3

Example was repeated using Compound 2 of that particle size, except that polymerisation was caused by ultra-violet irradiation. An ink, suitable for detection, in accordance with the invention was thus provided. Some thermochromism was detected by a change from light purple to pink. The particle size was found to be less than 10 $\mu$m by microscopy.

EXAMPLE 4

Compound 2 was included at 10% by weight in a solvent-based ink formulation. The ink was suitable for detection, and was also found to possess partially-reversible thermochromism. Light exposure stability was moderate. The thermochromic change was from light purple to pink.

EXAMPLE 5

Compound 4 was used instead of Compound 2 in Example 1, and an ink suitable for detection was provided. The ink additionally exhibited partially-reversible thermochromism from blue to pink. The particle size of Compound 2 before and after polymisation was on average 10 $\mu$m as measured microscopically.

EXAMPLE 6

Compound 4 was used instead of Compound 2 in Example 2. The ink was found to have no significant thermochromism but was suitable for the purposes of the invention. The chemical and heat stabilities of the ink were good. The ink had an orange-pink hue. The average particle size of Compound 4 before and after polymerisation was approximately 10 $\mu$m.

EXAMPLE 7

This was conducted as Example 3, except that Compound 4 was used in place of Compound 2. The ink possessed partially-reversible thermochromism of light blue to pink, and was suitable for the purposes of the invention. The average particle size of Compound 4 before and after polymerisation was approximately 10 $\mu$m.

EXAMPLE 8

Compound 12 was employed instead of Compound 2 in Example 1. An ink suitable for the purposes of the invention was provided.

EXAMPLE 9

Example 8 was repeated but in a lithographic ink vehicle, and the compound was polymerised before blending with the vehicle. An ink suitable for the purposes of the invention was provided.

EXAMPLE 10

This was conducted as Example 2, but Compound 14 replaced Compound 2. The ink had a dark orange-pink colour, although its heat-stability was inferior.

EXAMPLE 11

Compound 12 was obtained in the form of large (5-10 mm long) needle-shaped crystals. The crystals were subjected to micronisation in a vibration ball mill for 20 minutes, to give monomer particles 1-5 $\mu$m in size. The monomer was thermally polymerised at 150° C. for 20 hours, to give the corresponding polymer in the form of dark brown/black particles having similar dimensions to the monomer.

Evaluation

Five ink compositions were formulated, three in a letterpress vehicle comprising varnishes, wax and driers in a weight ratio of 90:9:1, respectively containing 10%, 5% and 2.5% by weight of the thermally-polymerised monomer particles. Two inks were formulated, respectively using 1% and 10% by weight of the polymer particles, in a litho vehicle comprising varnishes, wax and drier components in a weight ratio of 97:2:1. The inks were produced by passing through a triple-roll mill. Any aggregates were broken down by the shearing action of the mill.

The inks were printed on mould-made banknote paper using an IGT Printability Tester in the offset-letterpress mode. 1 ml ink was distributed and applied under 50 kgf for the letterpress formulations, and 0.3 ml ink was distributed and applied under 25 kgf for the litho formulations. The prints were allowed to dry for 4 days.

Prints were also prepared using the monomer. The monomer was incorporated at 10% into a letterpress vehicle using a Muller and printed offset-letterpress on the IGT Tester (1.0 ml; 50 kgf). The monomer prints were polymerised by irradiation with short-wave UV light (254 nm) for 30 min, to give prints very similar in colour to those obtained with the thermally-polymerised diacetylene.

For evaluation of Raman spectra, prints were prepared as above, from letterpress inks containing the following (F, G, H and I for the purposes of comparison):

A—1% thermally-polymerised Compound 12
B—10% Compound 12 monomer subsequently polymerised by UV irradiation
C—10% Compound 12 polymer plus 10% yellow pigment (CI Pigment Yellow 83)
D—10% Compound 12 polymer plus 10% orange pigment (CI Pigment Orange 34)
E—10% Compound 12 polymer plus 10% red pigment (CI Pigment Red 146)
F—letterpress vehicle only (control)
G—10% yellow pigment (control)
H—10% orange pigment (control)
I—10% red pigment (control)

This was to study the effect of adding ink pigments and to run controls.

The prints were exposed to laser light, using equipment described in the copending Application. The wavelength of the laser light should be such that it falls within the optical absorption bond of the compound, and for this purpose a HeNe laser (wavelength 632.8 nm) was used, and directed on to the print through a 40× objective. The power of the laser was 3–6.4 mW, and the intensity of light incident on the sample 1.5–3.2 mW. The scattered Raman light was picked up at the 40× objective and, after filtering to remove the wavelength of the incident laser light, was detected by a photomultiplier at the wavelength of maximum emission for the particular Raman scattering being tested.

In all the test prints containing the polymer (A, B, C, D, E), peaks due to the polydiacetylene backbone were readily observed. The vehicle, paper and coloured pigments gave some overall general scattering, but of sufficiently low intensity not to obscure the polydiacetylene peaks.

Raman peaks were not found in test prints F, G, H and I, indicating that the polydiacetylene was absent.

EXAMPLE 12

Compound 12 monomer (purity greater than 97%) was micronised in a vibration mill to produce a fine powder of average crystal size in the range 1–5 $\mu$m. 15 g of this powder, as a thinly-spread layer, was polymerised to give the polymer by heating for 24 hours at 150° C. The particle size of the polymer was also in the 1–5 $\mu$m range: this is because the monomer is crystalline and no significant change in particle size occurs during polymerisation.

An ink of the following composition (by weight) was prepared:

| Polymer of Compound 12 | 5 |
| Varnish mixture (phenolic resin, alkyd resin, modified drying oil-based) | 91 |
| Polyethylene wax | 3 |
| Cobalt Octoate Drier (10%) | 1 |

After mixing manually, the ink was passed through a triple-roll mill fully to disperse the polydiacetylene. The aggregates that were formed during ink blending were thus reduced to not greater than 3 $\mu$m in size, as measured by a fineness-of-grind gauge.

Prints were produced on rag based, mould-made paper using the IGT printability tester; 1 ml ink was distributed and printing was carried out in the offset-letterpress mode at 50 kgf. The centre of strip 4 was taken as the reference area.

Samples were prepared as in Example 11.

The Raman scatter of the samples was measured using the same equipment. A 6.4 mW HeNe laser was the source, and a X50, 0.8 NA objective focused light on the sample. Raman scattering intensity measured with a Thorn-EMI photomultiplier (RFI-QL 30F, 9153) operated at 900 v. The incident light was chopped at 150 Hz, and phase sensitive detection was used.

Signal strength was measured at the point of maximum response. Non-Raman background scattering including fluorescence was subtracted from the total signal, to give that solely due to Raman, thus providing a unique document authentication system.

TABLE 1

| Compound No. | R (in formula II) | $R^1$ (in formula II) |
|---|---|---|
| 1 | —$CH_2$—O—$SO_2$—(p-$C_6H_4$)—$CH_3$ | as R |
| 2 | —$(CH_2)_4$O—CO—NH—$C_2H_5$ | as R |
| 3 | —$(CH_2)_4$O—CO—NH—$CH(CH_3)_2$ | as R |
| 4 | —$(CH_2)_9CH_3$ | —$(CH_2)_8$COO—Li |
| 5 | —$(CH_2)_9CH_3$ | —$[(CH_2)_8COO]$ $\frac{1}{2}$[Cd] |
| 6 | —$(CH_2)_{11}CH_3$ | —(—$CH_2)_9$—O—CO—(4-pyr).HCl |
| 7 | —$(CH_2)_3$—O—CO—NH—$CH_2$—COO—$C_4H_9$ | as R |
| 8 | —$(CH_2)_4$—O—CO—NH—$CH_2$—COO—$C_4H_9$ | as R |
| 9 | —$(CH_2)_9$—O—CO—NH—$CH_2$—COO—$C_4H_9$ | as R |
| 10 | —$(CH_2)_9$—O—CO—$CH_2$—Ph | as R |
| 11 | —$CH_3$ | —$CH_2OH$ |
| 12 | 9-carbazolylmethyl | as R |
| 13 | —$CH_2OCONHC_2H_5$ | as R |
| 14 | —$(CH_2)_9CH_3$ | —$(CH_2)_8COOH$ |

We claim:

1. A Raman-active compound in the form of particles whose maximum dimension is 40 $\mu$m, the compound having the characteristic that, when applied to a substrate and exposed to laser light at an incident intensity of 1.5–3.2 mW, Raman scattering can be detected at a wavelength in the vicinity of maximum absorbance and at a level of at least 0.001 pW above the intensity of the background signal.

2. A compound according to claim I, wherein the Raman resonance scattering is at least 0.05 pW above the background signal.

3. A compound according to claim 1, wherein the Raman resonance scattering is at least 0.5 pW above the background signal.

4. A compound according to claim 1, wherein the Raman resonance scattering is at least 2 pW above the background signal.

5. A Raman-active compound in the form of particles whose maximum dimension is 40 $\mu$m, the compound having the characteristic that, when applied to a substrate and exposed to laser light at an incident intensity of 1.5–3.2 mW, resonance Raman scattering can be detected at a wavelength in the vicinity of maximum absorbance and at a factor of at least 0.1% of that for a comparative substrate bearing poly-1,6-di(N-carbazolyl)-2,4-hexadiyne.

6. A compound according to claim 5, wherein the factor is at least 1%.

7. A compound according to claim 5, wherein the factor is at least 10%.

8. A compound according to claim 5, wherein the factor is at least 30%.

9. A polydiacetylene in the form of particles whose maximum dimension is 40 μm.

10. A conjugated diacetylene in the form of particles whose maximum dimension is 40 μm.

11. A compound according to claim 1, wherein the maximum dimension is 10 μm.

12. A compound according to claim 11, wherein the maximum dimension is 5 μm.

13. A compound according to claim 11, wherein the maximum dimension is 1 μm.

14. An ink composition comprising a compound according to claim 1.

15. An ink composition according to claim 14, which comprises 1 to 10% by weight of the compound.

16. An ink composition according to claim 14, which further comprises a drier and an ink vehicle.

17. A security document including a Raman-active compound, according to claim 1.

18. A security document including a polydiacetylene in the form of particles having a maximum dimension of 40 μm.

19. A security document printed with an ink composition according to claim 14.

20. A method of authenticating a security document according to claim 17, which comprises irradiating the document and detecting the presence of the compound.

21. A Raman-active compound comprising a polydiacetylene applied to a substrate in the form of particles having a maximum dimension of 40 μm, the compound having the characteristic that, when applied to said substrate and exposed to laser light at an incident intensity of 1.5–3.2 mW, Raman scattering can be detected at a wavelength in the vicinity of maximum absorbance and at a level of at least 0.001 pW above the intensity of background signal or resonance Raman scattering can be detected at a wavelength in the vicinity of maximum absorbance and at a factor of at least 0.1% of that for a comparative substrate bearing poly-1,6-di(N-carbazolyl)-2,4-hexadiyne.

* * * * *